US006766889B1

(12) United States Patent
Pennycuff

(10) Patent No.: US 6,766,889 B1
(45) Date of Patent: Jul. 27, 2004

(54) WEDGE FORK CLUTCH ACTUATOR FOR DRIVELINE CLUTCHES

(75) Inventor: Dale L. Pennycuff, Shelby Township, MI (US)

(73) Assignee: New Venture Gear, Inc., Troy, MI (US)

(*) Notice: Subject to any disclaimer, the term of this patent is extended or adjusted under 35 U.S.C. 154(b) by 0 days.

(21) Appl. No.: 10/364,865

(22) Filed: Feb. 11, 2003

(51) Int. Cl.[7] .............................................. B60K 17/34
(52) U.S. Cl. .................... 192/35; 192/70.23; 192/82 P; 192/84.6; 192/93 R; 180/249
(58) Field of Search ................. 192/35, 70.23, 192/82 P, 84.6, 93 R; 180/247, 248, 249, 250

(56) References Cited

U.S. PATENT DOCUMENTS

| 2,487,936 A | * 11/1949 | McCrady et al. ........ 192/70.23 |
| 3,547,229 A | * 12/1970 | Pollinger et al. ............. 188/59 |
| 4,805,486 A | 2/1989 | Hagiwara et al. |
| 4,895,236 A | 1/1990 | Sakakibara et al. |
| 4,976,347 A | 12/1990 | Sakakibara et al. |
| 5,007,886 A | 4/1991 | Holmquist et al. |
| 5,323,871 A | 6/1994 | Wilson et al. |
| 5,407,024 A | 4/1995 | Watson et al. |
| 5,423,235 A | 6/1995 | Botterill et al. |
| 5,997,428 A | * 12/1999 | Kagata et al. .............. 475/198 |
| 6,398,686 B1 | 6/2002 | Irwin |

FOREIGN PATENT DOCUMENTS

| DE | 3908478 A1 | 5/1989 |
| JP | 62-18117 A | 1/1987 |
| JP | 3-66927 A | 3/1991 |

* cited by examiner

Primary Examiner—Richard M. Lorence
(74) Attorney, Agent, or Firm—Harness, Dickey & Pierce P.L.C.

(57) ABSTRACT

A torque transfer mechanism is provided for controlling the magnitude of a clutch engagement force exerted on a multi-plate clutch assembly that is operably disposed between a first rotary and a second rotary member. The torque transfer mechanism includes a clutch actuator for generating and applying a clutch engagement force on the clutch assembly. The clutch actuator includes a wedge fork having a gear rack segment and a tapered tang segment and a reaction block defining a tapered edge in sliding engagement with the tapered tang segment. An electric motor drives a pinion that is meshed with the gear rack to cause bi-directional linear movement of the wedge fork which causes corresponding sliding movement of the reaction block relative to the clutch assembly.

39 Claims, 13 Drawing Sheets

WEDGE FORK CLUTCH ACTUATOR FOR DRIVELINE CLUTCHES

FIELD OF THE INVENTION

The present invention relates generally to power transfer systems for controlling the distribution of drive torque between the front and rear drivelines of a four-wheel drive vehicle. More particularly, the present invention is directed to a power transmission device for use in motor vehicle driveline applications and having a power-operated clutch actuator that is operable for controlling actuation of a multi-plate friction clutch assembly.

BACKGROUND OF THE INVENTION

In view of increased demand for four-wheel drive vehicles, a plethora of power transfer systems are currently being incorporated into vehicular driveline applications for transferring drive torque to the wheels. In many vehicles, a power transmission device is operably installed between the primary and secondary drivelines. Such power transmission devices are typically equipped with a torque transfer mechanism for selectively and/or automatically transferring drive torque from the primary driveline to the secondary driveline to establish a four-wheel drive mode of operation. For example, the torque transfer mechanism can include a dog-type lock-up clutch that can be selectively engaged for rigidly coupling the secondary driveline to the primary driveline to establish a "part-time" four-wheel drive mode. In contrast, drive torque is only delivered to the primary driveline when the lock-up clutch is released for establishing a two-wheel drive mode.

A modern trend in four-wheel drive motor vehicles is to equip the power transmission device with an adaptive transfer clutch in place of the lock-up clutch. The transfer clutch is operable for automatically directing drive torque to the secondary wheels, without any input or action on the part of the vehicle operator, when traction is lost at the primary wheels for establishing an "on-demand" four-wheel drive mode. Typically, the transfer clutch includes a multi-plate clutch assembly that is installed between the primary and secondary drivelines and a clutch actuator for generating a clutch engagement force that is applied to the clutch plate assembly. The clutch actuator can be a power-operated device that is actuated in response to electric control signals sent from an electronic controller unit (ECU). Variable control of the electric control signal is typically based on changes in current operating characteristics of the vehicle (i.e., vehicle speed, interaxle speed difference, acceleration, steering angle, etc.) as detected by various sensors. Thus, such "on-demand" power transmission devices can utilize adaptive control schemes for automatically controlling torque distribution during all types of driving and road conditions.

A large number of on-demand power transmission devices have been developed with an electrically-controlled clutch actuator that can regulate the amount of drive torque transferred to the secondary output shaft as a function of the value of the electrical control signal applied thereto. In some applications, the transfer clutch employs an electromagnetic clutch as the power-operated clutch actuator. For example, U.S. Pat. No. 5,407,024 discloses a electromagnetic coil that is incrementally activated to control movement of a ball-ramp drive assembly for applying a clutch engagement force on the multi-plate clutch assembly. Likewise, Japanese Laid-open Patent Application No. 62-18117 discloses a transfer clutch equipped with an electromagnetic actuator for directly controlling actuation of the multi-plate clutch pack assembly.

As an alternative, the transfer clutch can employ an electric motor and a drive assembly as the power-operated clutch actuator. For example, U.S. Pat. No. 5,323,871 discloses an on-demand transfer case having a transfer clutch equipped with an electric motor that controls rotation of a sector plate which, in turn, controls pivotal movement of a lever arm that is operable for applying the clutch engagement force to the multi-plate clutch assembly. Moreover, Japanese Laid-open Patent Application No. 63-66927 discloses a transfer clutch which uses an electric motor to rotate one cam plate of a ball-ramp operator for engaging the multi-plate clutch assembly. Finally, U.S. Pat. Nos. 4,895,236 and 5,423,235 respectively disclose a transfer case equipped with a transfer clutch having an electric motor driving a reduction gearset for controlling movement of a ball screw operator and a ball-ramp operator which, in turn, apply the clutch engagement force to the clutch pack.

While many on-demand clutch control systems similar to those described above are currently used in four-wheel drive vehicles, a need exists to advance the technology and address recognized system limitations. For example, the size and weight of the friction clutch components and the electrical power requirements of the clutch actuator needed to provide the large clutch engagement loads may make such system cost prohibitive in some four-wheel drive vehicle applications. In an effort to address these concerns, new technologies are being considered for use in power-operated clutch actuator applications.

SUMMARY OF THE INVENTION

Thus, its is an object of the present invention to provide a power transmission device for use in a motor vehicle having a torque transfer mechanism equipped with a power-operated clutch actuator that is operable to control engagement of a multi-plate clutch assembly.

As a related object, the torque transfer mechanism of the present invention is well-suited for use in motor vehicle driveline applications to control the transfer of drive torque between a first rotary member and a second rotary member.

According to a preferred embodiment, a transfer case is provided for use in a four-wheel drive motor vehicle having a powertrain and first and second drivelines. The transfer case includes a first shaft driven by the powertrain and adapted for connection to the first driveline a second shaft adapted for connection to the second driveline, and a friction clutch assembly operably disposed between the first shaft and the second shaft. The transfer case further includes a clutch actuator for generating and applying a clutch engagement force on the friction clutch assembly. The clutch actuator includes a wedge fork having a stem segment with a gear rack and a tang segment with a tapered drive surface, and a reaction block having a tapered reaction surface engaging said tapered drive surface on said tang segment and an apply surface engaging said friction clutch assembly. An electric motor drives a pinion gear that is meshed with the gear rack for causing bi-directional translational movement of the wedge fork. A controller controls actuation of the motor such that bi-directional translational movement of the wedge fork causes sliding movement of the reaction block for applying the clutch engagement force to the friction clutch assembly.

BRIEF DESCRIPTION OF THE DRAWINGS

Further objects, features and advantages of the present invention will become apparent to those skilled in the art from analysis of the following written description, the appended claims, and accompanying drawings in which:

DETAILED DESCRIPTION OF THE PREFERRED EMBODIMENTS

The present invention is directed to a torque transfer mechanism that can be adaptively controlled for modulating the torque transferred from a first rotary member to a second rotary member. The torque transfer mechanism finds particular application in power transmission devices for use in motor vehicle drivelines such as, for example, an on-demand clutch in a transfer case or in-line torque coupling, a biasing clutch associated with a differential assembly in a transfer case or a drive axle assembly, or as a shift clutch in a multi-speed automatic transmission. Thus, while the present invention is hereinafter described in association with particular arrangements for use in specific driveline applications, it will be understood that the arrangements shown and described are merely intended to illustrate embodiments of the present invention.

Figure 1:
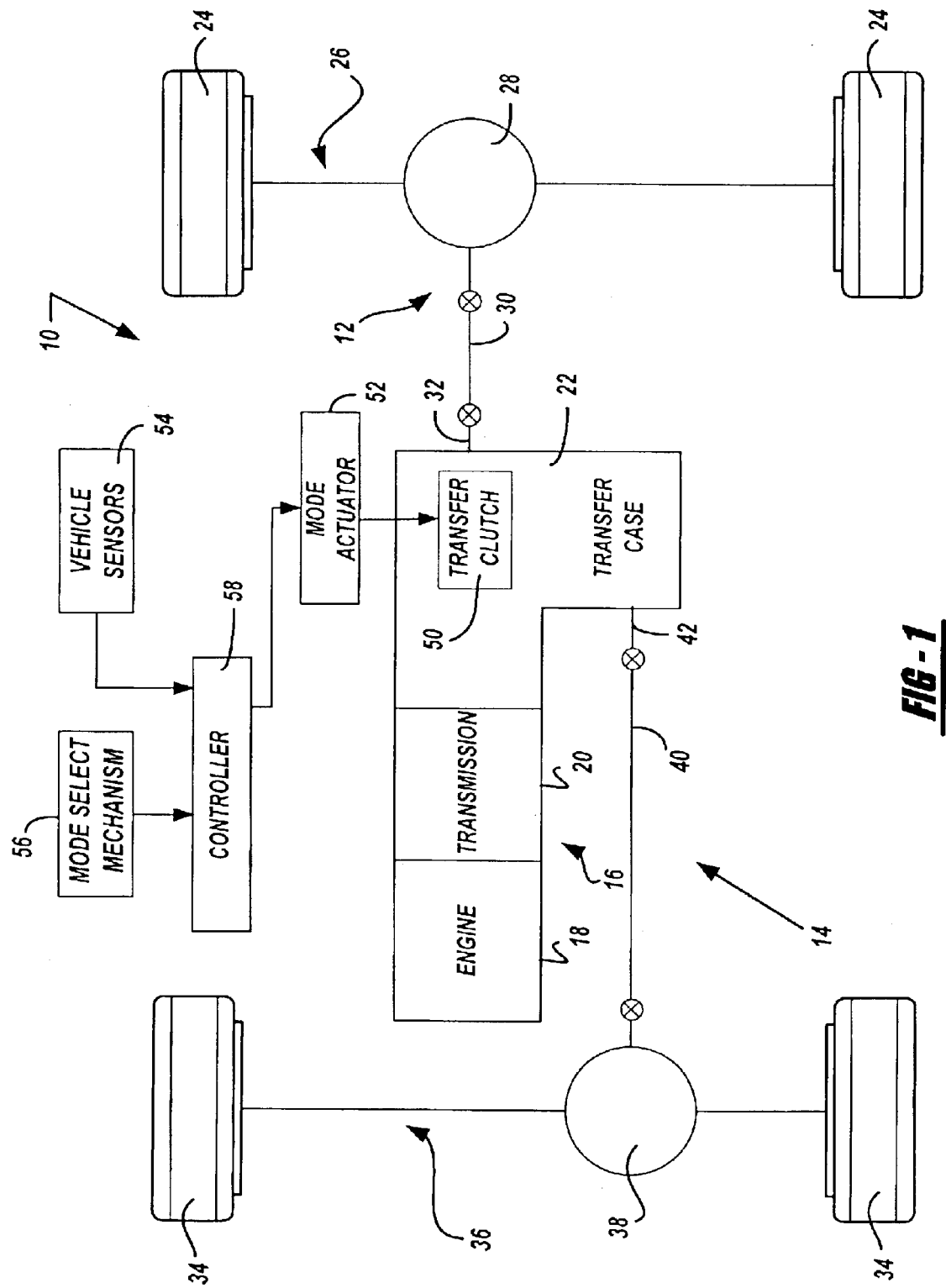
FIG. 1 illustrates the drivetrain of a four-wheel drive vehicle equipped with the power transmission device of the present invention.

With particular reference to FIG. 1 of the drawings, a drivetrain 10 for a four-wheel drive vehicle is shown. Drivetrain 10 includes a primary driveline 12, a secondary driveline 14, and a powertrain 16 for delivering rotary tractive power (i.e., drive torque) to the drivelines. In the particular arrangement shown, primary driveline 12 is the rear driveline while secondary driveline 14 is the front driveline. Powertrain 16 includes an engine 18, a multi-speed transmission 20, and a power transmission device hereinafter referred to as transfer case 22. Rear driveline 12 includes a pair of rear wheels 24 connected at opposite ends of a rear axle assembly 26 having a rear differential 28 coupled to one end of a rear prop shaft 30, the opposite end of which is coupled to a rear output shaft 32 of transfer case 22. Front driveline 14 includes a pair of front wheels 34 connected at opposite ends of a front axle assembly 36 having a front differential 38 coupled to one end of a front prop shaft 40, the opposite end of which is coupled to a front prop shaft 42 of transfer case 22.

With continued reference to the drawings, drivetrain 10 is shown to further include an electronically-controlled power transfer system for permitting a vehicle operator to select between a two-wheel drive mode a locked ("part-time") four-wheel drive mode, and an adaptive ("on-demand") four-wheel drive mode. In this regard, transfer case 22 is equipped with a transfer clutch 50 that can be selectively actuated for transferring drive torque from rear output shaft 32 to front output shaft 42 for establishing the part-time and on-demand four-wheel drive modes. The power transfer system further includes a power-operated mode actuator 52 for actuating transfer clutch 50, vehicle sensors 54 for detecting certain dynamic and operational characteristics of the motor vehicle, a mode select mechanism 56 for permitting the vehicle operator to select one of the available drive modes, and a controller 58 for controlling actuation of mode actuator 52 in response to input signals from vehicle sensors 54 and mode selector 56.

Figure 2:
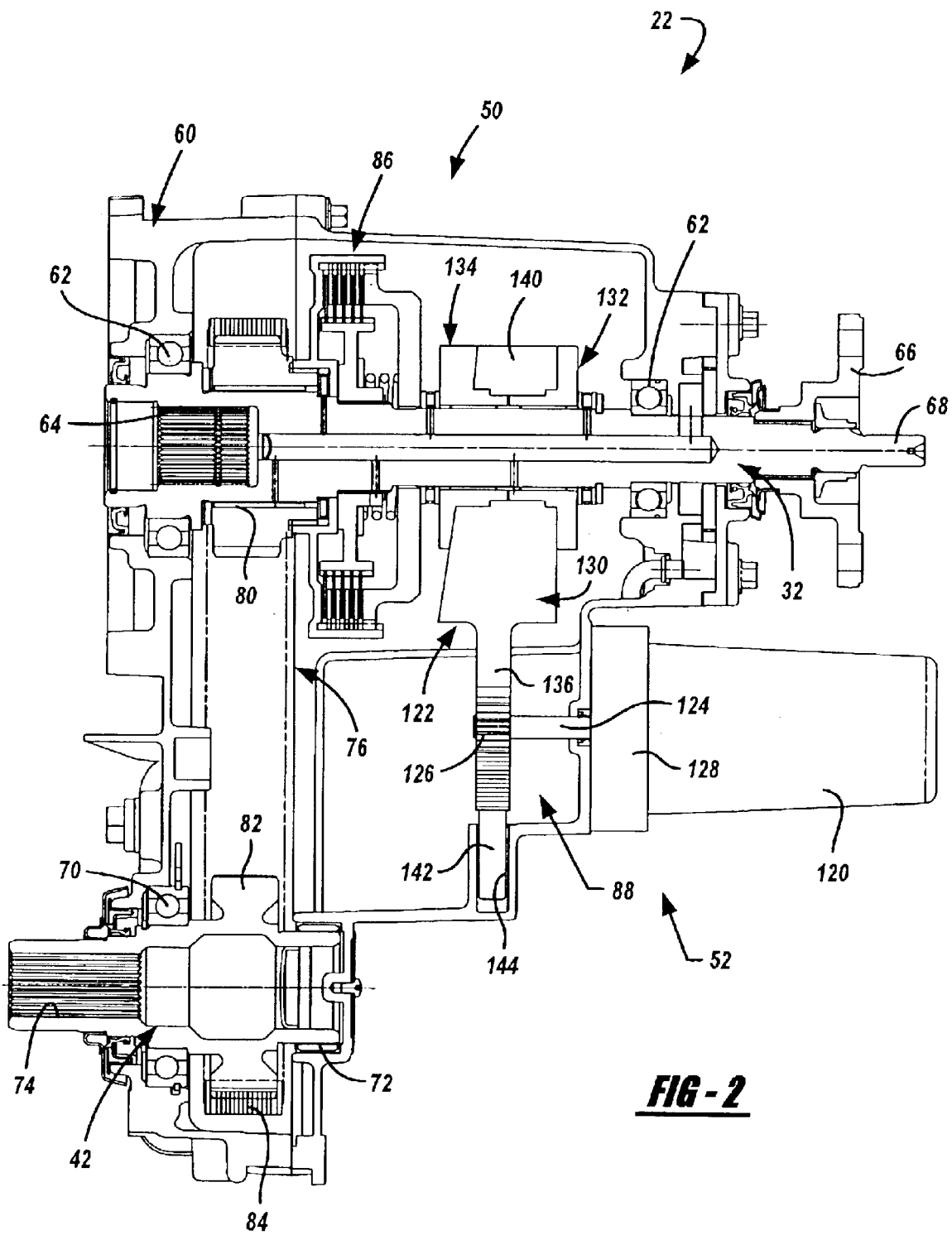
FIG. 2 is a sectional view of a transfer case associated with the drivetrain shown in FIG. 1 and which is equipped with a torque transfer mechanism according to a first embodiment of the present invention.

Transfer case 22 is shown in FIG. 2 to include a multi-piece housing 60 from which rear output shaft 32 is rotatably supported by a pair of laterally-spaced bearing assemblies 62. Rear output shaft 32 includes an internally-splined first end segment 64 adapted for connection to the output shaft of transmission 20 and a yoke assembly 66 secured to its second end segment 68 that is adapted for connection to rear propshaft 30. Front output shaft 42 is likewise rotatably supported from housing 60 by a pair of laterally-spaced bearing assemblies 70 and 72 and includes an internally-splined end segment 74 that is adapted for connection to front propshaft 40.

Figure 3:
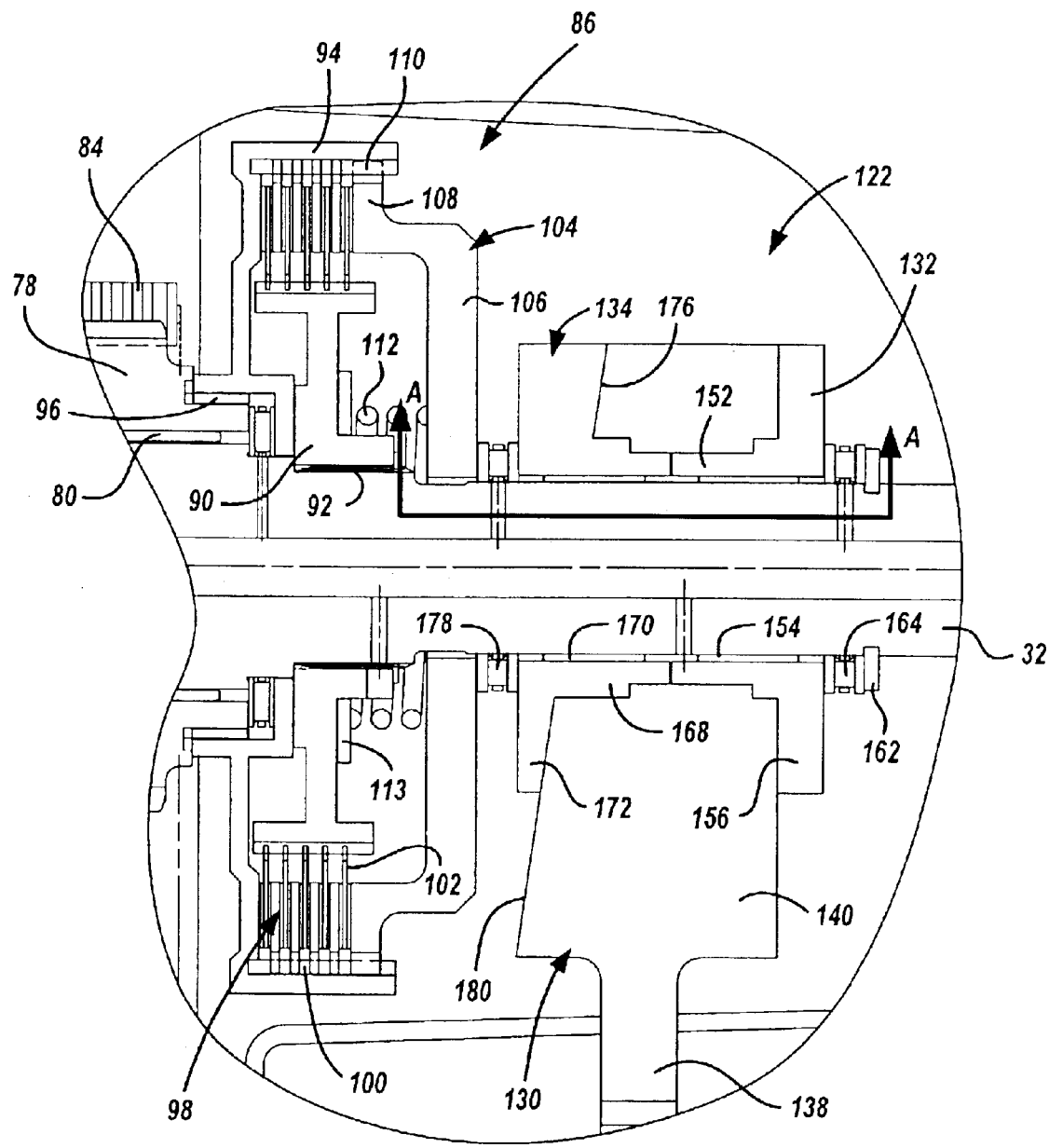
FIG. 3 is an enlarged partial view taken from FIG. 2 showing components of the torque transfer mechanism is greater detail.
Figure 4:
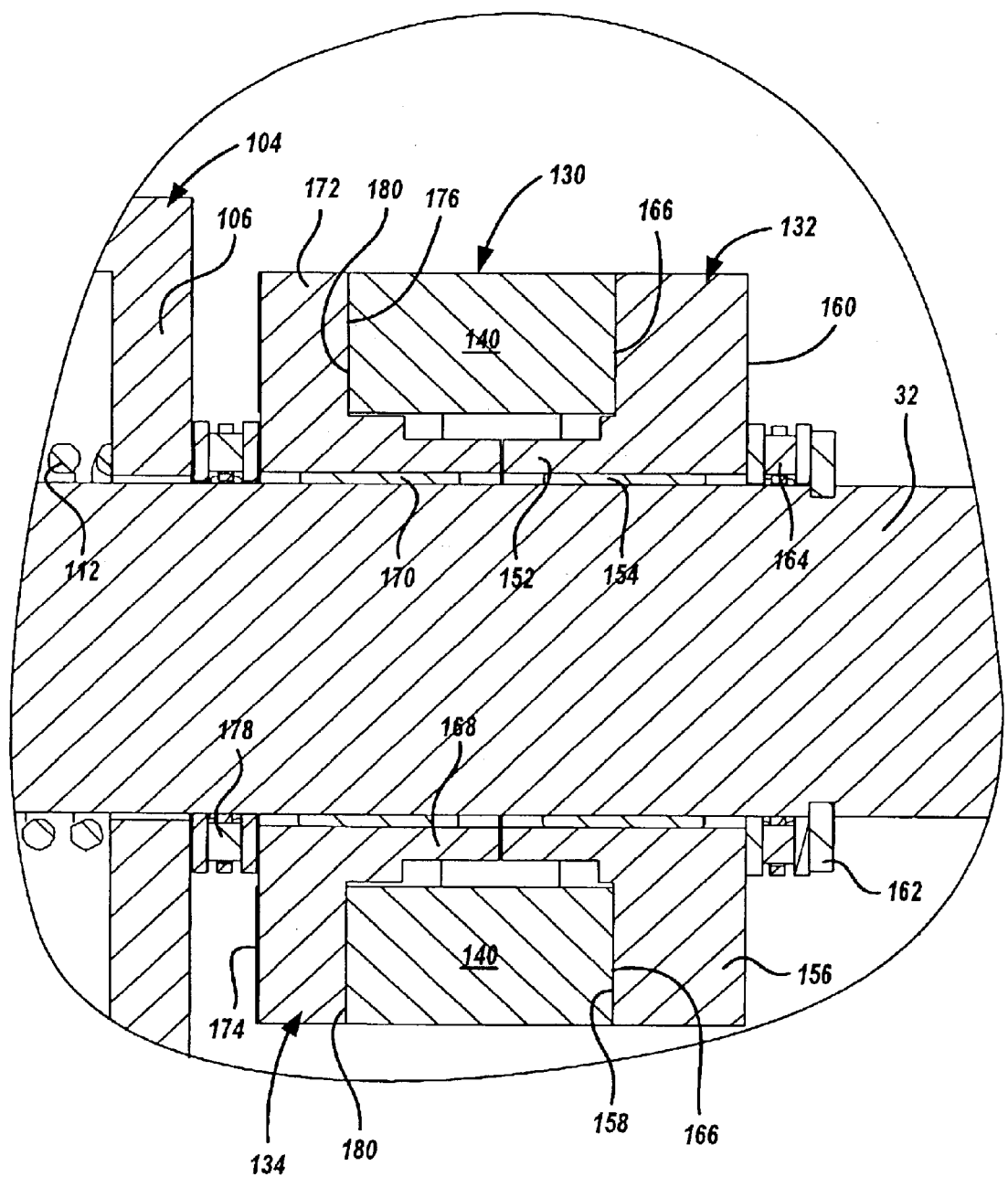
FIG. 4 is a sectional taken general along line A—A of FIG. 3.
Figure 5:
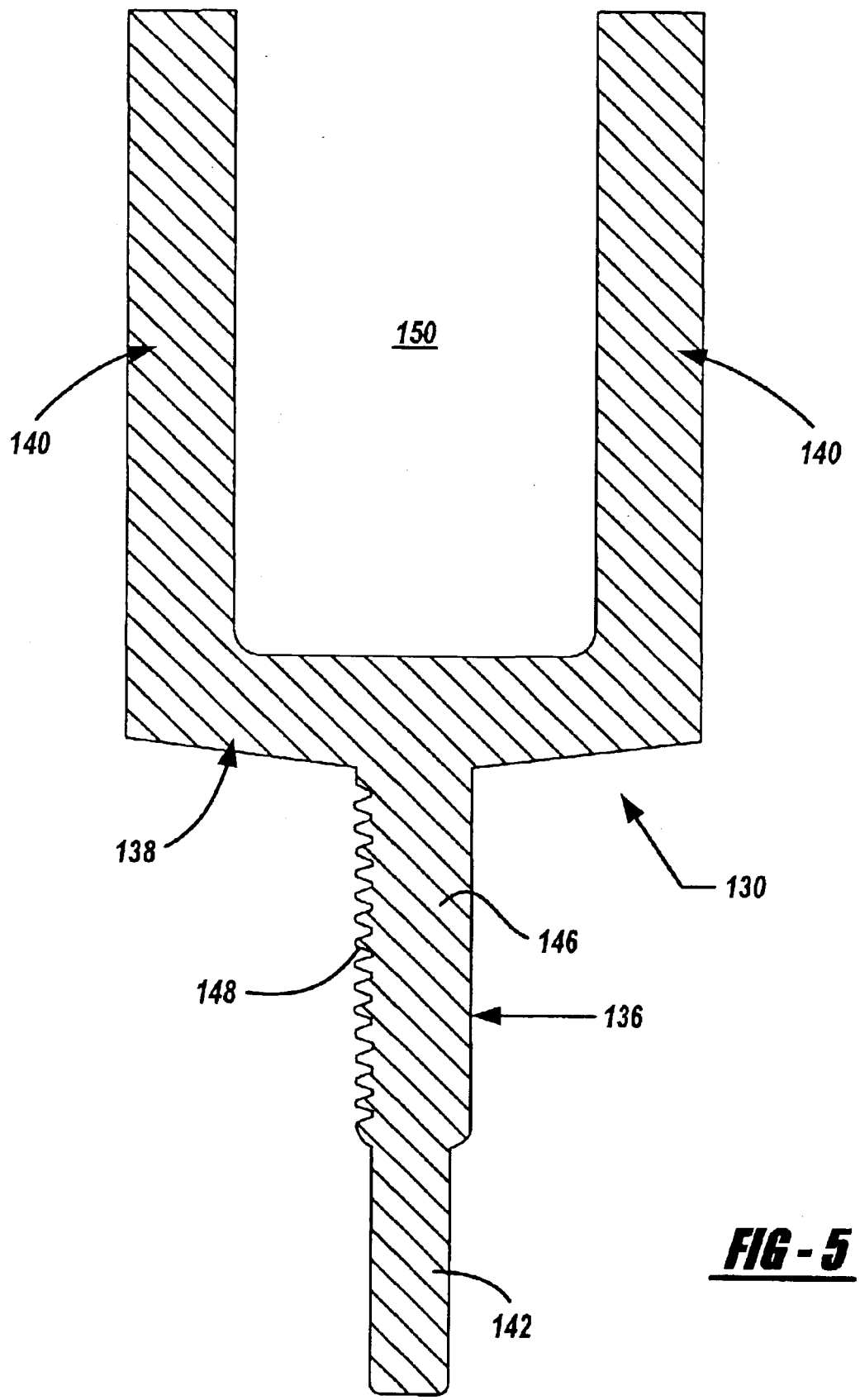
FIG. 5 is a sectional view of the-wedge fork associated with the torque transfer mechanism of FIGS. 2 and 3.

Referring primarily to FIGS. 2, 3 and 4, transfer clutch 50 and mode actuator 52 are shown in association with transfer case 22 for transferring drive torque from rear output shaft 32 through a transfer assembly 76 to front output shaft 42. Transfer assembly 76 includes a first sprocket 78 rotatably supported by a sleeve bushing 80 on rear output shaft 32, a second sprocket 82 fixed to, or integrally formed on, front output shaft 42 for rotation therewith, and a power chain 84 encircling sprockets 78 and 82. As will be detailed, transfer clutch 50 is a multi-plate friction clutch assembly 86 and mode actuator 52 is a motor-driven wedge-type clutch actuator assembly 88 which together define a torque transfer mechanism.

Clutch assembly 86 is shown to include a hub 90 fixed via a spline connection 92 to rear output shaft 32, a drum 94 fixed via a spline connection 96 to first sprocket 78 of transfer assembly 76, and a multi-plate clutch pack 98 operably disposed between hub 90 and drum 94. Clutch pack 98 includes a set of outer clutch plates 100 that are splined to an annular rim segment of drum 94 and which are alternatively interleaved with a set of inner clutch plates 102 that are splined to an annular rim segment of hub 90. Clutch assembly 86 further includes a pressure plate 104 having a first disk segment 106 journalled for sliding movement on rear output shaft 32 and a second disk segment 108 fixed via a spline connection 110 for rotation with drum 94. Second disk segment 108 of pressure plate 104 is operably arranged to exert a compressive clutch engagement force on clutch pack 98 in response to axial movement of pressure plate 104 which, as will be detailed, is controlled by clutch actuator assembly 88.

Pressure plate 104 is axially moveable relative to clutch pack 98 between a first or "released" position and a second or "locked" position. With pressure plate 104 in its released position, a minimum clutch engagement force is exerted on clutch pack 98 such that virtually no drive torque is transferred from rear output shaft 32 through clutch assembly 86 and transfer assembly 76 to front output shaft 42 so as to establish the two-wheel drive mode. In contrast, location of pressure plate 104 in its locked position causes a maximum clutch engagement force to be applied to clutch pack 98 such that front output shaft 42 is, in effect, coupled for common rotation with rear output shaft 32 so as to establish the part-time four-wheel drive mode. Therefore, accurate control of the position of pressure plate 104 between its released and locked positions permits adaptive regulation of the amount of drive torque transferred from rear output shaft 32 to front output shaft 42, thereby establishing the on-demand four-wheel drive mode. A helical coil spring 112 coaxially surrounds a portion of rear output shaft 32 and acts between a retainer ring 113 abutting hub 90 and first disk segment 106 of pressure plate 104 for normally urging pressure plate toward its released position.

To provide means for moving pressure plate 104 between its released and locked positions, clutch actuator assembly 88 is generally shown to include an electric motor 120 and a wedge fork operator 122. Electric motor 120 is mounted to housing 60 and includes a driveshaft 124 to which a drive pinion 126 is fixed. Preferably, a planetary speed reduction unit 128 is provided between the output of motor 120 and driveshaft 126 to increase the output torque of drive pinion 126. Wedge fork operator 122 includes a wedge fork 130 and first and second reaction blocks 132 and 134, respectively. Wedge fork 130 includes an elongated stem segment 136, a transverse web segment 138, and a pair of upstanding fork tangs 140. Stem segment 136 has an end portion 142 adapted for retention in a socket 144 formed in housing 60 and an intermediate portion 146 having one side face surface on which a gear rack 148 is formed.

Gear rack 148 is meshed with drive pinion 126 such that the amount and direction of rotation of drive pinion 126 controls the linear movement of wedge fork 130 between a first or "retracted" position and a second or "extended" position. As seen, fork tangs 140 extend from web segment 138 in a common plane with stem segment 136 and are laterally-spaced to define a channel 150. Channel 150 permits fork tangs 140 to be located for linear movement on opposite sides of rear output shaft 32.

First reaction block 132 is shown to include an annular hub segment 152 mounted on rear output shaft 32 via a bushing 154 and a plate segment 156 having a front face surface 158 and a rear face surface 160. Rearward axial movement of first reaction block 132 relative to rear output shaft 32 is restrained via a snap ring 162 and a thrust bearing assembly 164 that is located between rear face surface 160 and snap ring 162. Front face surface 158 is shown to be orthonganal to the rotary axis of rear output shaft 32 and in contact with a rear face surface 166 of each fork tang 140 on wedge fork 130. Second reaction block 134 includes an annular hub segment 168 that is mounted on rear output shaft 32 via a bushing 170 and a plate segment 172 having a front face surface 174 and a rear face surface 176. A thrust bearing assembly 178 is located between front face surface 174 of second reaction block 134 and first disk segment 106 of pressure plate 104. Front face surface 174 is shown to be orthonganal to the rotary axis of rear output shaft 32. In contrast, rear face surface 176 is best shown in FIG. 3 to be angled or tapered and is in contact with a similarly tapered front face surface 180 of each fork tang 140 on wedge fork 130. In operation, linear translation of wedge fork 130 causes tapered face surface 180 on fork tangs 140 to act against tapered face surface 176 of second reaction block 134. This action results in sliding movement of second reaction block 134 which, in turn, causes corresponding axial movement of pressure plate 104.

Wedge fork 130 is shown in FIGS. 2 and 3 in its retracted position which corresponds to pressure plate 104 being located in its released position. When electric motor 120 is thereafter energized, driveshaft 126 is rotated in a first direction such that the torque on drive pinion 126 is converted into an axial force on gear rack 148. This axial force causes wedge fork 130 to move from its retracted position in a first (i.e., upward in FIG. 2) linear direction toward its extended position. Such linear movement of wedge fork 130 causes the angular relationship between face surface 180 on fork tangs 140 and face surface 176 of second reaction block 134 to generate a longitudinal force coaxial to the rotary axis of rear output shaft 32. This longitudinal force is a function of the tangent of the fork tang/second reaction block taper angle and is of a magnitude several times greater than the axial force actually applied to wedge fork 130. This longitudinal force is transmitted by second reaction block 134 through thrust bearing assembly 178 to apply plate 104 and causes movement of apply plate 104, in opposition to the biasing force exerted by return spring 112, for exerting a corresponding clutch engagement force on clutch pack 98.

In operation, when mode selector 56 indicates selection of the two-wheel drive mode, controller 58 signals electric motor 120 to rotate drive pinion 126 in the second direction for moving wedge fork 130 in a second (i.e., downward in FIG. 2) linear direction until it is located in its retracted position. Such action permits return spring 112 to forcibly urge pressure plate 104 to move to its released position. If mode selector 56 thereafter indicates selection of the part-time four-wheel drive mode, electric motor 120 is signaled by controller 58 to rotate drive pinion 126 in the first direction for linearly translating wedge fork 130 in the first direction until it is located in its extended position. Such movement of wedge fork 130 to its extended position acts to cause corresponding movement of pressure plate 104 to its locked position, thereby coupling front output shaft 42 to rear output shaft 32 through clutch assembly 86 and transfer assembly 76.

When mode selector 56 indicates selection of the on-demand four-wheel drive mode, controller 58 energizes motor 120 to rotate drive pinion 126 until wedge fork 130 is located in a ready or "stand-by" position. This position may be its retracted position or, in the alternative, an intermediate position. In either case, a predetermined minimum amount of drive torque is delivered to front output shaft 42 through clutch assembly 86 in this stand-by condition. Thereafter, controller 58 determines when and how much drive torque needs to be transferred to front output shaft 42 based on current tractive conditions and/or operating characteristics of the motor vehicle, as detected by sensors 54. Many control schemes are known in the art for adaptively controlling actuation of a transfer clutch in a driveline application. In this regard, commonly owned U. S. Pat. No. 5,323,871 discloses a non-limiting example of a clutch control scheme and the various sensors used therewith, the entire disclosure of which is incorporated by reference.

Figure 6:
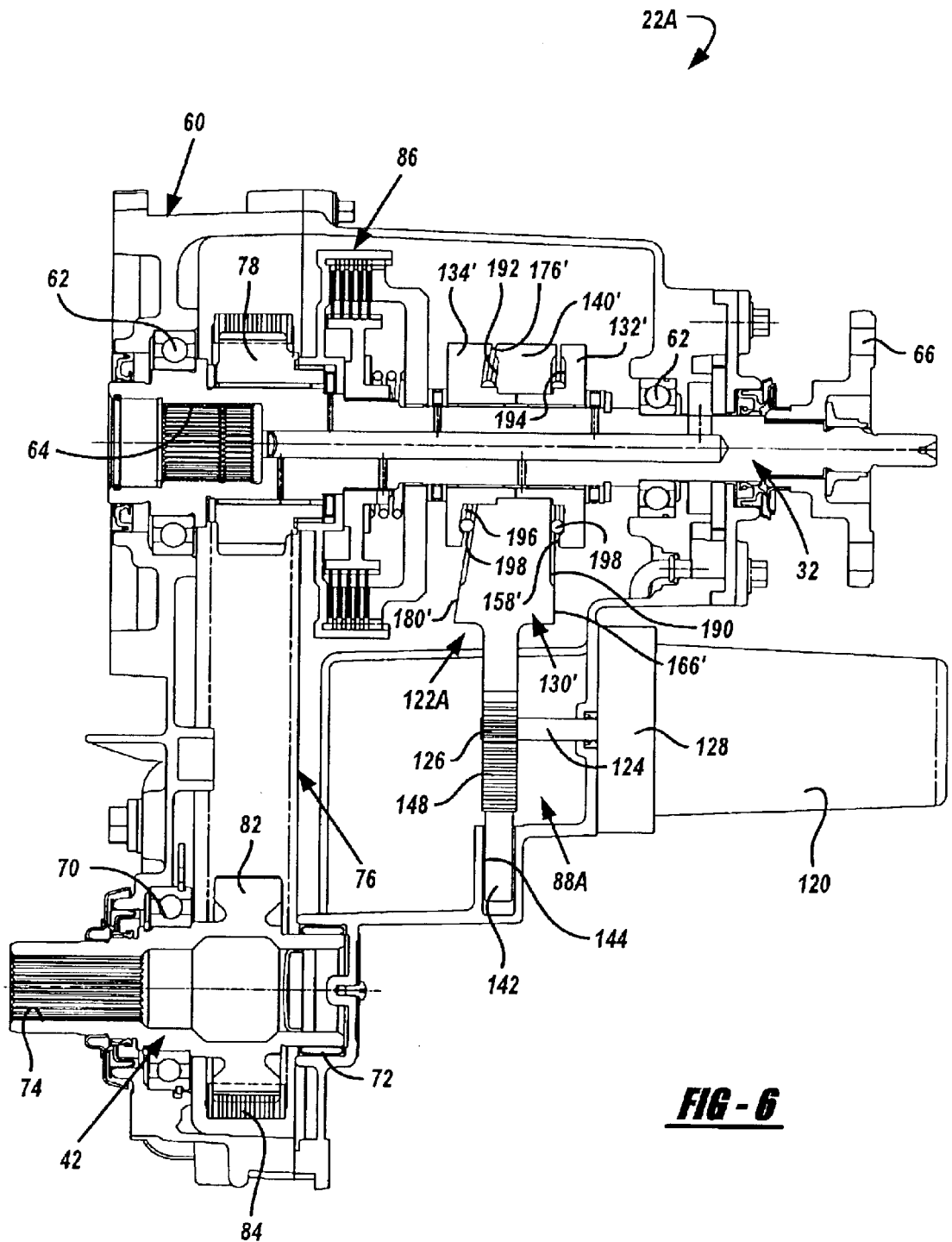
FIG. 6 is a sectional view of the transfer case equipped with a torque transfer mechanism according to a second embodiment of the present invention.

Referring now to FIG. 6, a transfer case 22A is shown with a torque transfer mechanism having a clutch actuator assembly 88A incorporating a modified wedge fork operator 122A. For purposes of clarity and brevity, common reference numerals are used to identify those components of transfer case 22A shown in FIG. 6 which are similar to those components described previously in association with transfer case 22, with the exception that primed reference numerals indicate slightly modified components. In general, wedge fork operator 122A differs from wedge fork operator 122 in that rollers are retained in guide slots formed between the reaction blocks and the wedge fork. In particular, each fork tang 140' of wedge fork 130' has at lease one elongated guide slot 190 formed in its rear face surface 166' at and at least one guide slot 192 formed in its front face surface 180'. Guide slots 190 in fork tangs 140' are aligned with guide slots 194 formed in front face surface 158' of first reaction block 132'. Similarly, guide slots 192 in fork tangs 140' are aligned with guide slots 196 formed in rear face surface 176' of second reaction block 134'. Rollers 198 are disposed in the aligned sets of guide slots and are provided to reduce friction generated during movement of wedge fork 130' relative to reaction blocks 132' and 134'. Preferably, aligned sets of guide slots 190 and 194 are oriented to be orthonganal to the rotary axis of rear output shaft 32 while the aligned sets of guide slots 192 and 196 combine to establish a cam pathway that is angled relative to the rotary axis. The angular orientation of the cam pathway is selected to provide the desired force multiplication and travel characteristics required for the particular application. It will be appreciated that the torque transfer mechanism shown in FIG. 6 is controlled and operates similar to that described previously for the torque transfer mechanism shown in FIGS. 2 through 4.

Figure 7:
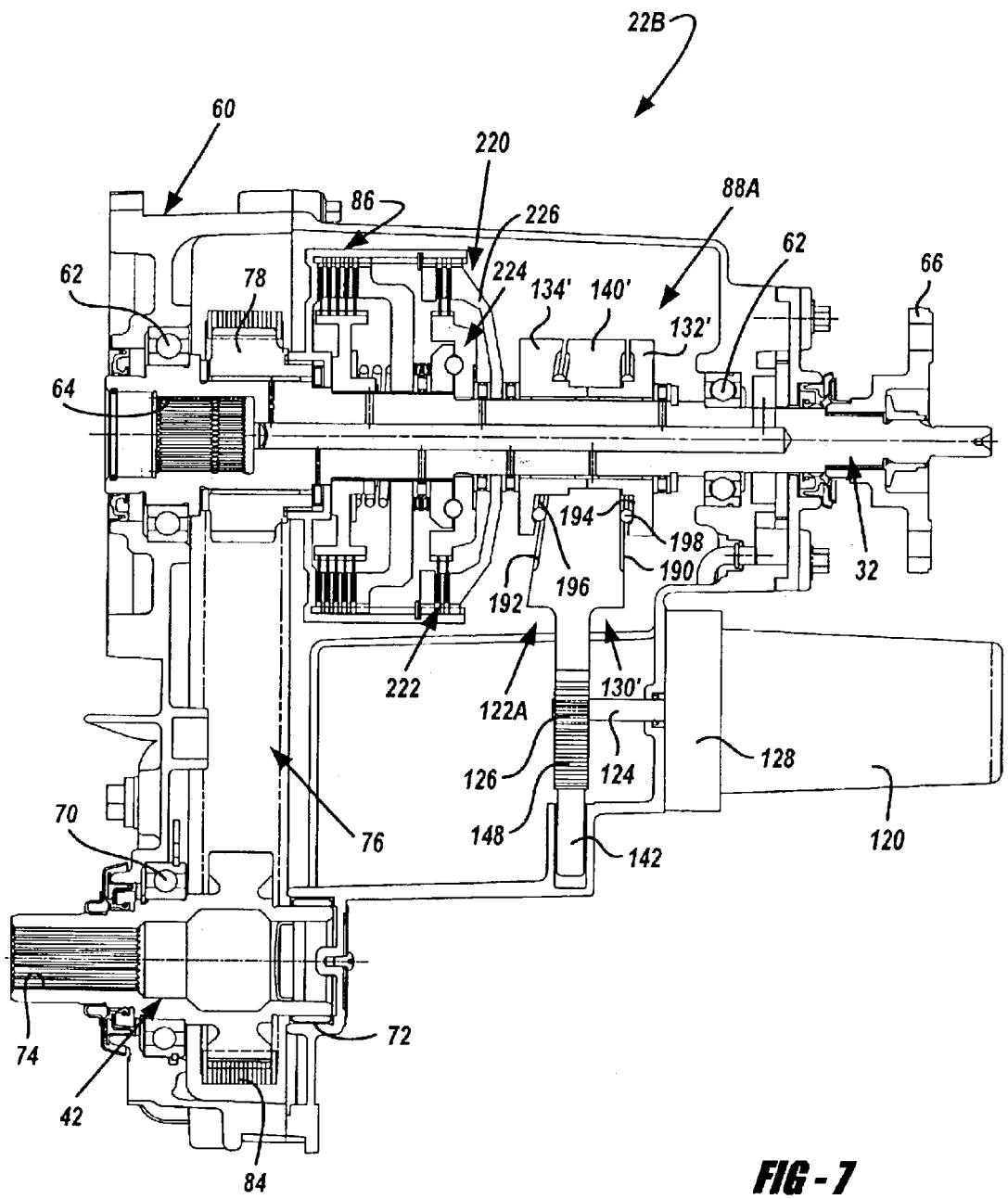
FIG. 7 is a sectional view of a third embodiment of a torque transfer mechanism installed in a transfer case.
Figure 8:
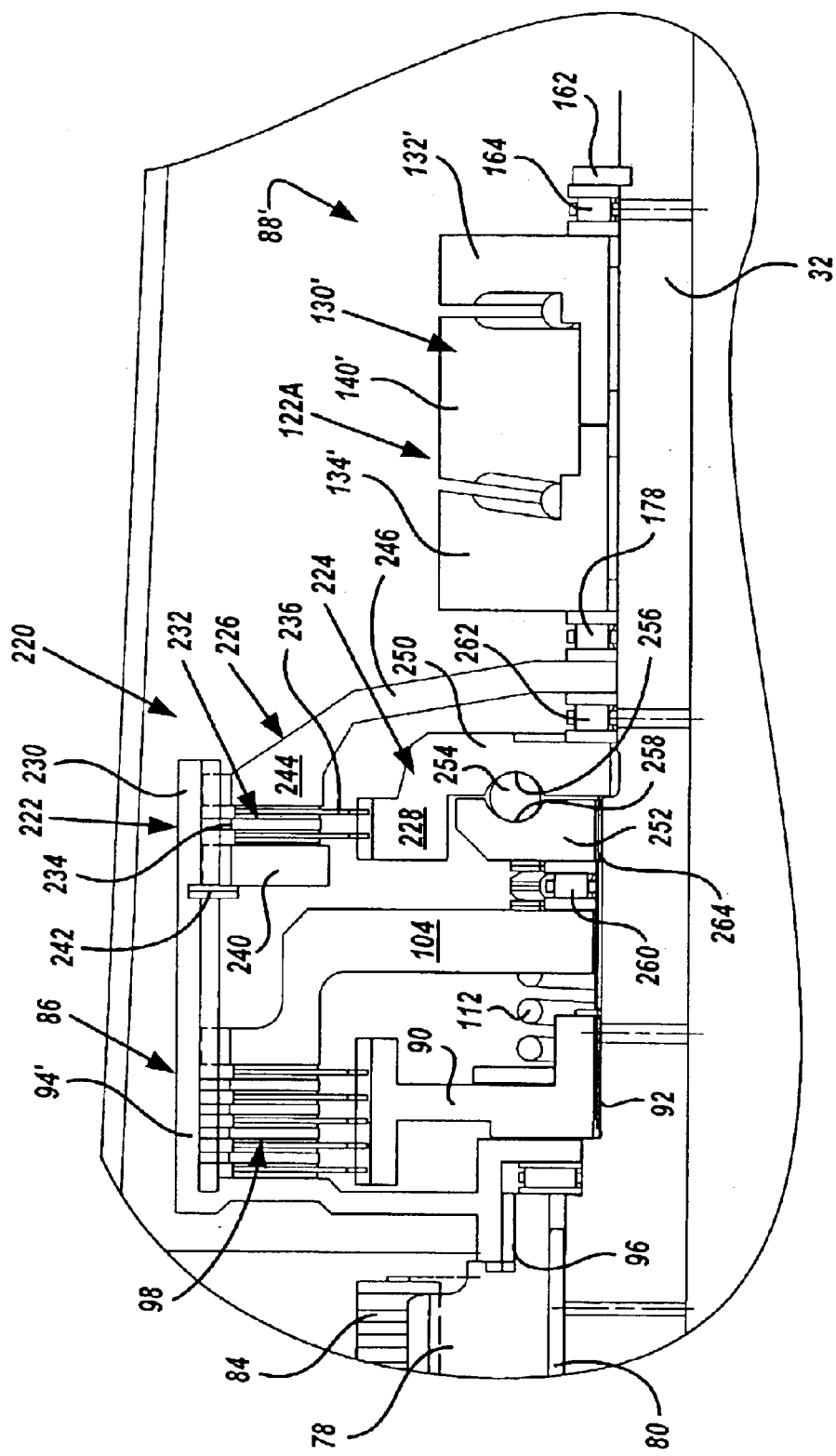
FIG. 8 is an enlarged partial view of FIG. 7 showing the components of the torque transfer mechanism in greater detail.

Referring now to FIGS. 7 and 8, a transfer case 22B is shown equipped with another alternative embodiment of a torque transfer mechanism that is generally similar to that shown in FIG. 6 with the exception that a pilot clutch 220 has now been operably installed between clutch assembly 86 and clutch actuator assembly 88A. Pilot clutch 220 generally includes a second friction clutch assembly 222, a ball ramp operator 224, and a second pressure plate 226. Second friction clutch assembly 222 includes a hub 228, an extended rim segment 230 on drum 94', and a clutch pack 232 having at least one outer plate 234 that is splined to rim segment 230 of drum 94' and which is interleaved with a set of inner clutch plates 236 that are splined to hub 228. Clutch assembly 222 also includes a reaction plate 240 splined to rim segment 230 of drum 94' and which is axially located thereon via a snap ring 242. Second pressure plate 226 is shown to include an apply plate segment 244 also splined to rim segment 230 of drum 94' and a plate segment 246 which is supported for sliding movement on rear output shaft 32.

In operation, actuation of clutch actuator assembly 88' causes second reaction block 134 to move second pressure plate 226 for engaging second friction clutch assembly 222 which, in turn, functions to actuate ball ramp operator 224. Ball ramp operator 224 includes a first cam ring 250 to which hub 228 of second friction clutch assembly 222 is fixed, and a second cam ring 252 fixed via a spline connection 264 to rear output shaft 32. Ball ramp operator 224 further includes load transferring rollers, such as balls 254, that are retained in a plurality of aligned sets of cam tracks 256 and 258 respectively formed in first cam ring 250 and second cam ring 252. Cam tracks 256 and 258 have a varying or ramped groove depth such that relative rotation between first cam ring 250 and second cam ring 252 causes axial movement of second cam ring 252. Axial movement of second cam ring 252 results in corresponding movement of first pressure plate 104 for controlling engagement of first friction clutch assembly 86. As seen, a thrust bearing assembly 260 is disposed between second cam ring 252 and pressure plate 104 while another thrust bearing assembly 262 is located between first cam ring 250 and drum segment 246 of second pressure plate 226. Preferably, cam tracks 256 and 258 represent oblique sections of a helical torus. However, balls 254 and cam tracks 256 and 258 may be replaced with alternative components that cause axial displacement of second cam ring 250 and second cam ring 252. In any arrangement, the load transferring components must not be self-locking or self-engaging so as to permit adaptive actuation of the clutch assembly.

Ball ramp operator 224 is provided to multiply the apply force exerted by wedge fork operator 122A for increasing the clutch engagement force ultimately exerted by pressure plate 104 on clutch pack 98. Spring 112 functions to apply a biasing force on pressure plate 104 and second cam ring 252 of ball ramp operator 224 which will release second friction clutch assembly 222 when wedge fork 130' is moved to its retracted position. Variable control of the location of wedge fork 130' generates a variable apply force that is exerted by second reaction block 134' on second pressure plate 226 which, in turn, controls engagement of clutch pack 232 and the cam thrust force outputted from ball ramp operator 224 to pressure plate 104. The use of pilot clutch 220 for amplifying the clutch engagement force applied to primary friction clutch assembly 86 allows the size and number of clutch plates to be reduced and further permits finer control over clutch engagement which results in smoother operation.

Figure 9:
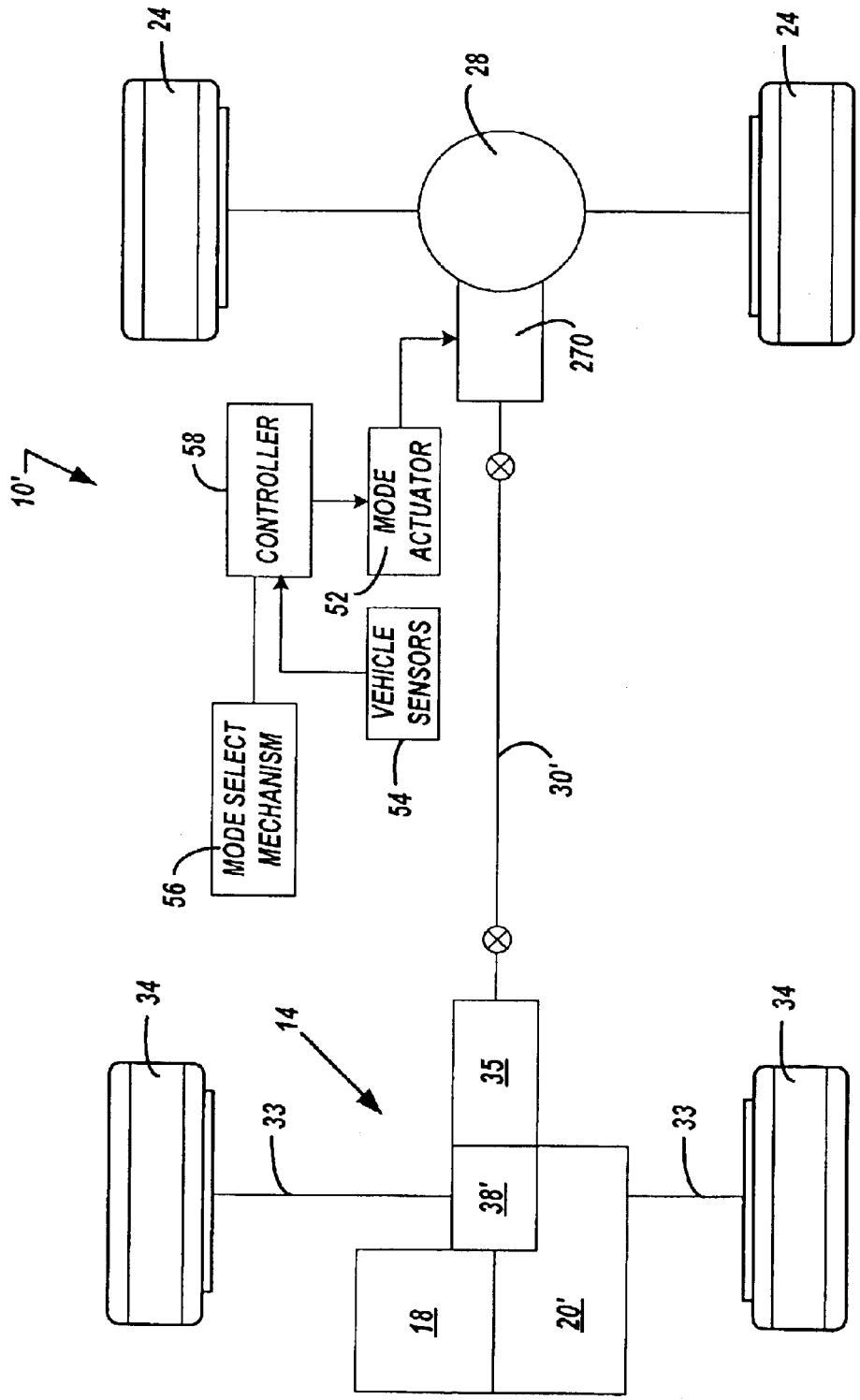
FIG. 9 is a schematic illustration of an alternative driveline for a four-wheel drive motor vehicle equipped with a power transmission device of the present invention.

To illustrate an alternative power transmission device to which the present invention is applicable, FIG. 9 schematically depicts a front-wheel based four-wheel drivetrain layout 10' for a motor vehicle. In particular, engine 18 drives a multi-speed transmission 20' having an integrated front differential unit 38' for driving front wheels 34 via axle shafts 33. A transfer unit 35 is also driven by transmission 20' for delivering drive torque to the input member of an in-line torque transfer coupling 270 via a drive shaft 30'. In particular, the input member of transfer coupling 270 is coupled to drive shaft 30' while its output member is coupled to a drive component of rear differential 28 which, in turn, drives rear wheels 24 via axleshafts 25. Accordingly, when sensors indicate the occurrence of a front wheel slip condition, controller 58 adaptively controls actuation of torque coupling 270 such that drive torque is delivered "on-demand" to rear wheels 24. It is contemplated that torque transfer coupling 270 would include a multi-plate clutch assembly and a clutch actuator that is generally similar in structure and function to that of any of the devices previously described herein. Furthermore, while shown in association with rear differential 28, it is contemplated that torque coupling 270 could also be operably located at the front of the motor vehicle for transferring drive torque from transfer unit 35 to drive shaft 30'.

Figure 10:
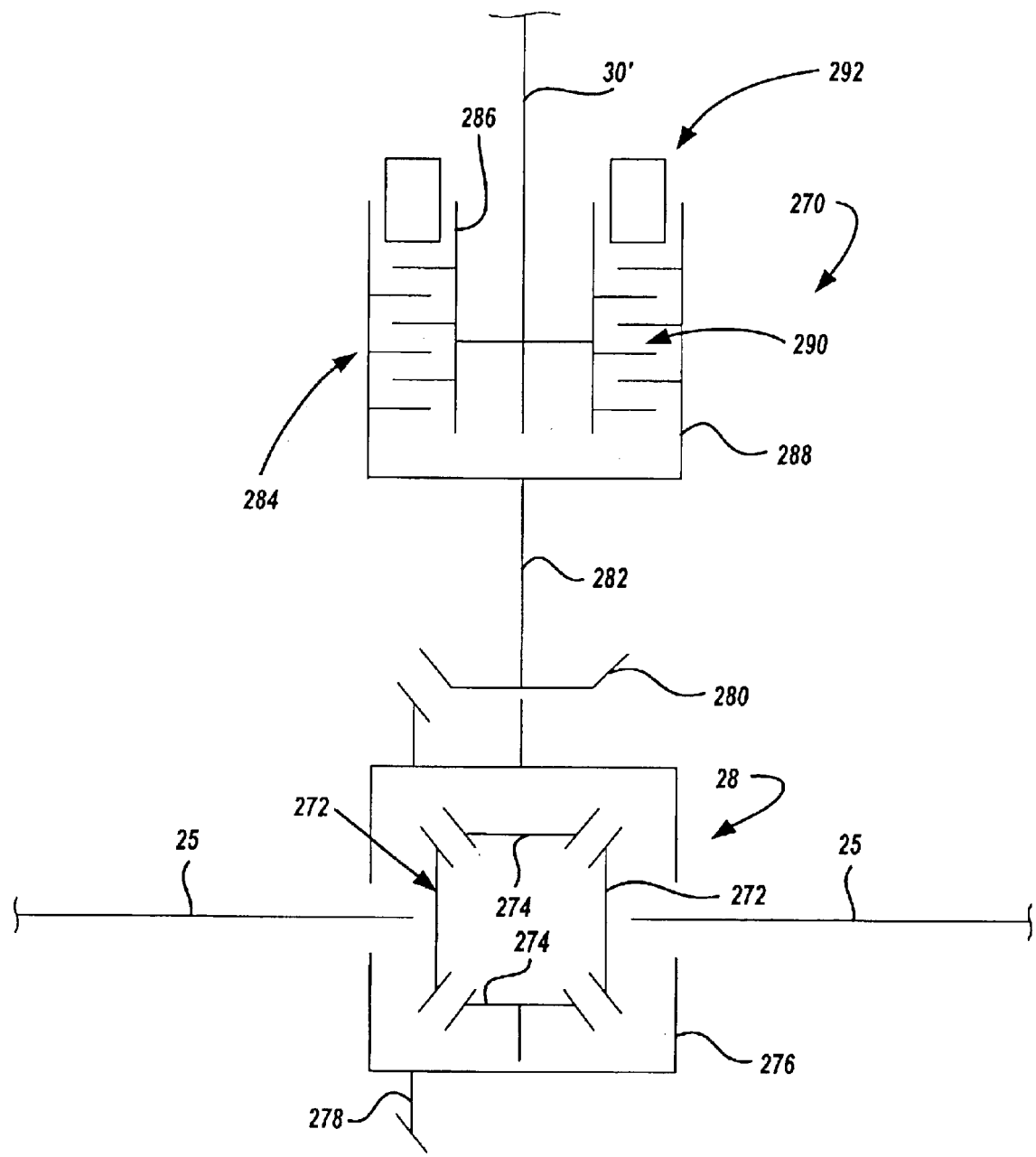
FIGS. 10 through 15 are schematic view of additional embodiments of power transmission devices equipped with the torque transfer mechanisms of the present invention.

Referring to FIG. 10, torque coupling 270 is schematically illustrated operably disposed between drive shaft 30' and rear differential 28. Rear differential 28 includes a pair of side gears 272 that are connected to rear wheels 24 via rear axle shafts 25. Differential 28 also includes pinions 274 that are rotatably supported on pinion shafts fixed to a carrier 276 and which mesh with side gears 272. A right-angled drive mechanism is associated with differential 28 and includes a ring gear 278 that is fixed for rotation with carrier 276 and which is meshed with a pinion gear 280 that is fixed for rotation with a pinion shaft 282.

Torque coupling 270 includes a mutli-plate clutch assembly 284 operably disposed between driveshaft 30' and pinion shaft 282 and which includes a hub 286 fixed to driveshaft 30', a drum 288 fixed to pinion shaft 282, and a clutch pack 290. Torque coupling 270 also includes a clutch actuator 292 for controlling engagement of clutch assembly 284 and thus the amount of drive torque transferred from drive shaft 30' to differential 28. Accordingly, to the present invention, clutch actuator 292 is contemplated to be similar to motor-driven wedge-type clutch actuators 88 or 88' in that an electric motor controls translation of a wedge fork operator which, in turn, controls engagement of clutch pack 290.

Torque coupling 270 permits operation in any of the drive modes previously disclosed. For example, if the on-demand 4WD mode is selected, controller 58 regulates activation of clutch actuator 292 in response to operating conditions detected by sensors 54 by varying the electric control signal sent to the electric motor. Selection of the part-time 4WD mode results in complete engagement of clutch pack 290 such that pinion shaft 282 is rigidly coupled to driveshaft 30'. Finally, in the two-wheel drive mode, clutch pack 290 is released such that pinion shaft 282 is free to rotate relative to driveshaft 30'.

Figure 11:
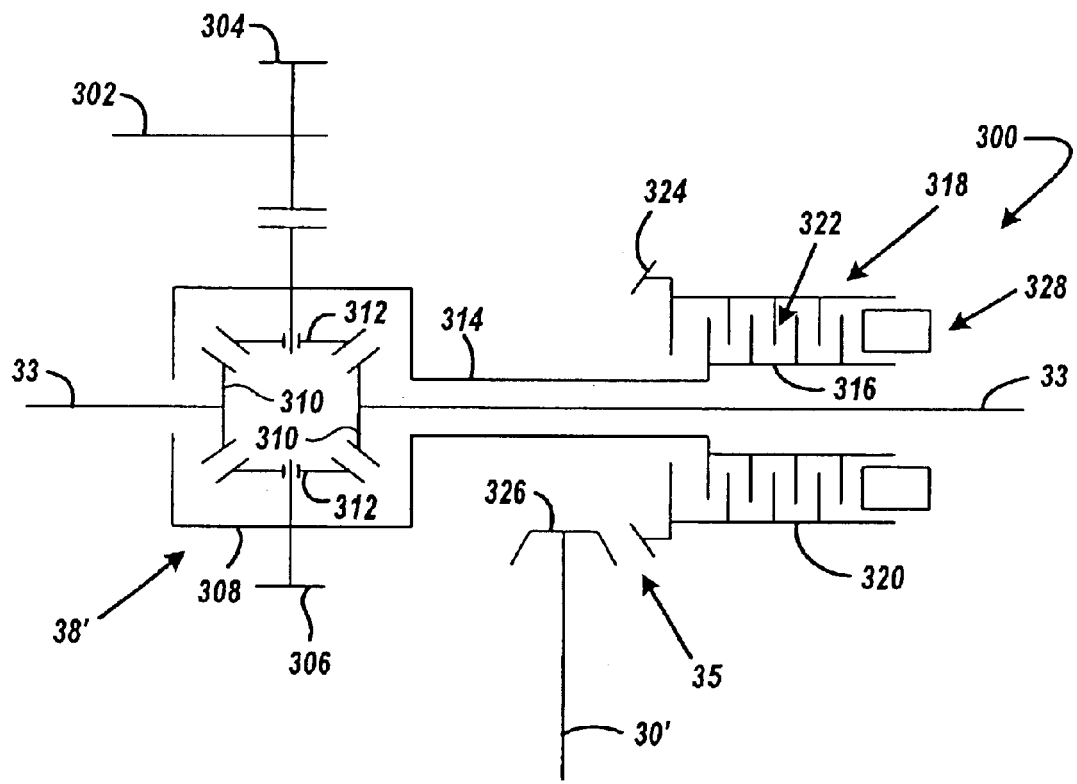

Referring now to FIG. 11, a torque coupling 300 is schematically illustrated in association with an on-demand four-wheel drive system based on a front-wheel drive vehicle similar to that shown in FIG. 9. In particular, an output shaft 302 of transaxle 20' is shown to drive an output gear 304 which, in turn, drives an input gear 306 fixed to a carrier 308 associated with front differential unit 38'. To provide drive torque to front wheels 34, front differential unit 38' includes a pair of side gears 310 that are connected to front wheels 34 via axleshafts 33. Differential unit 38' also includes pinions 312 that are rotatably supported on pinion shafts fixed to carrier 308 and which are meshed with side gears 310. A transfer shaft 314 is provided to transfer drive torque from carrier 308 to a clutch hub 316 associated with a multi-pate clutch assembly 318. Clutch assembly 318 further includes a drum 320 and a clutch pack 322 having interleaved clutch plates operably connected between hub 316 and drum 320.

Transfer unit 35 is a right-angled drive mechanism including a ring gear 324 fixed for rotation with drum 320 of clutch assembly 318 which is meshed with a pinion gear 326 fixed for rotation with drive shaft 30'. As seen, a clutch actuator assembly 328 is schematically illustrated for controlling actuation of clutch assembly 318. According to the present invention, clutch actuator assembly 328 is similar to either the motor-driven wedge-type clutch actuators 88, 88' previously described in that an electric motor is supplied with electric current for controlling translational movement of a wedge fork operator which, in turn, controls engagement of clutch pack 322. In operation, drive torque is transferred from the primary (i.e., front) driveline to the secondary (i.e., rear) driveline in accordance with the particular mode selected by the vehicle operator via mode selector 56. For example, if the on-demand 4WD mode is selected, controller 58 modulates actuation of clutch actuator 328 in response to the vehicle operating conditions detected by sensors 54 by varying the value of the electric control signal sent to the motor. In this manner, the level of clutch engagement and the amount of drive torque that is transferred through clutch pack 322 to the rear driveline through transfer unit 35 and drive shaft 30' is adaptively controlled. Selection of a locked or part-time 4WD mode results in full engagement of clutch assembly 318 for rigidly coupling the front driveline to the rear driveline. In some applications, the mode selector 56 may be eliminated such that only the on-demand 4WD mode is available so as to continuously provide adaptive traction control without input from the vehicle operator.

Figure 12:
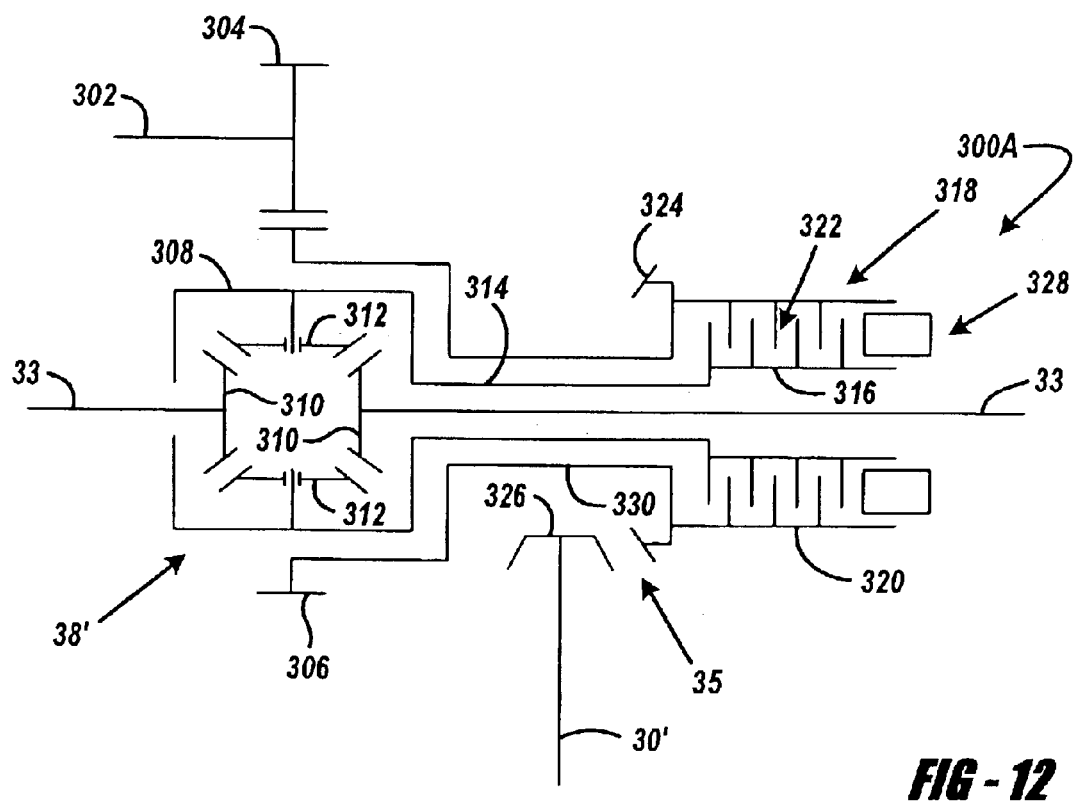

FIG. 12 illustrates a modified version of FIG. 11 wherein an on-demand four-wheel drive system is shown based on a rear-wheel drive motor vehicle that is arranged to normally deliver drive torque to rear wheels 24 while selectively transmitting drive torque to front wheels 34 through a torque coupling 300A. In this arrangement, drive torque is transmitted directly from transmission output shaft 302 to transfer unit 35 via a drive shaft 330 interconnecting input gear 306 to ring gear 324. To provide drive torque to front wheels 34, torque coupling 300A is shown operably disposed between drive shaft 330 and transfer shaft 314. In particular, clutch assembly 318 is arranged such that drum 320 is driven with ring gear 324 by drive shaft 330. As such, actuation of clutch actuator 328 functions to transfer torque from drum 320 through clutch pack 322 to hub 316 which, in turn, drives carrier 308 of front differential unit 38' via transfer shaft 314. Again, the vehicle could be equipped with mode selector 56 to permit selection by the vehicle operator of either the adaptively controlled on-demand 4WD mode or the locked part-time 4WD mode. In vehicles without mode selector 56, the on-demand 4WD mode is the only drive mode available and provides continuous adaptive traction control without input from the vehicle operator.

Figure 13:
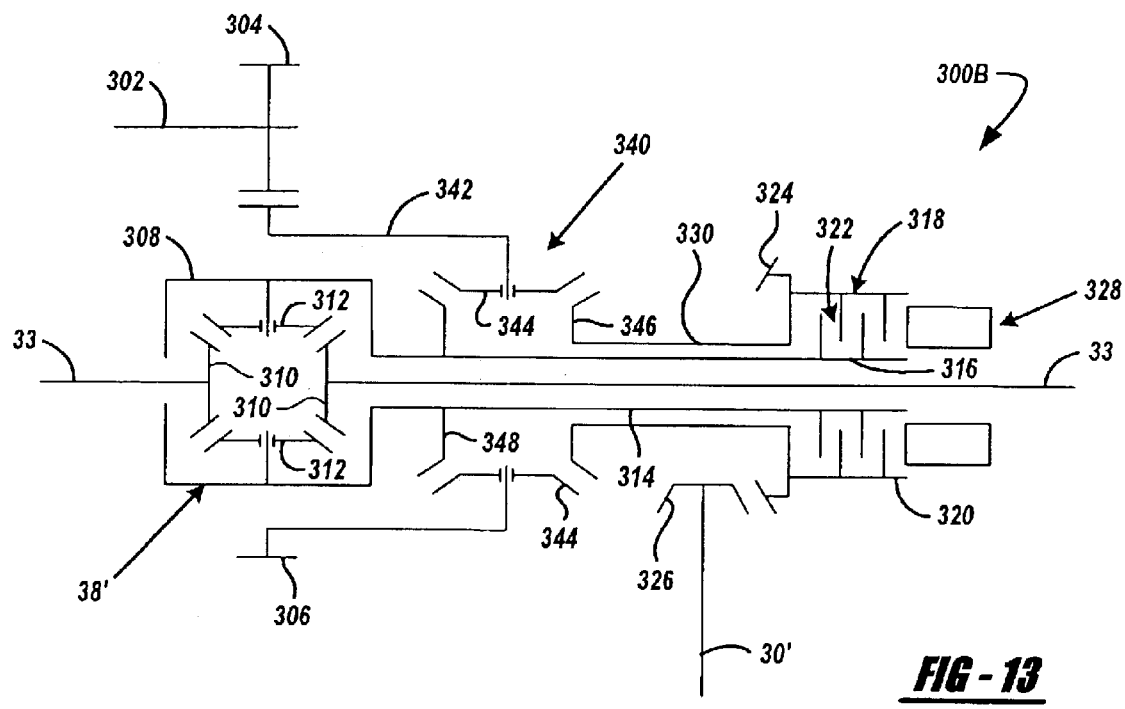

In addition to the on-demand 4WD systems shown previously, the power transmission technology of the present invention can likewise be used in full-time 4WD systems to adaptively bias the torque distribution transmitted by a center or "interaxle" differential unit to the front and rear drivelines. For example, FIG. 13 schematically illustrates a full-time four-wheel drive system which is generally similar to the on-demand four-wheel drive system shown in FIG. 12 with the exception that an interaxle differential unit 340 is now operably installed between carrier 308 of front differential unit 38' and transfer shaft 314. In particular, output gear 306 is fixed for rotation with a carrier 342 of interaxle differential 340 from which pinion gears 344 are rotatably supported. A first side gear 346 is meshed with pinion gears 344 and is fixed for rotation with drive shaft 330 so as to be drivingly interconnected to the rear driveline through transfer unit 35. Likewise, a second side gear 348 is meshed with pinion gears 344 and is fixed for rotation with carrier 308 of front differential unit 38' so as to be drivingly interconnected to the front driveline. A torque transfer mechanism 300B is now shown to be operably disposed between side gears 346 and 348. Torque transfer mechanism 300B is similar to torque transfer mechanism 300A except that it is operably arranged between the driven outputs of interaxle differential 340 for providing a torque biasing and slip limiting function. Torque transfer mechanism 300B is shown to include multi-plate clutch assembly 318 and clutch actuator 328. Clutch assembly 318 is operably arranged between transfer shaft 314 and driveshaft 330. In operation, when sensor 54 detects a vehicle operating condition, such as excessive interaxle slip, controller 58 adaptively controls activation of the electric motor associated with clutch actuator 328 for controlling engagement of clutch assembly 318 and thus the torque biasing between the front and rear driveline.

Figure 14:
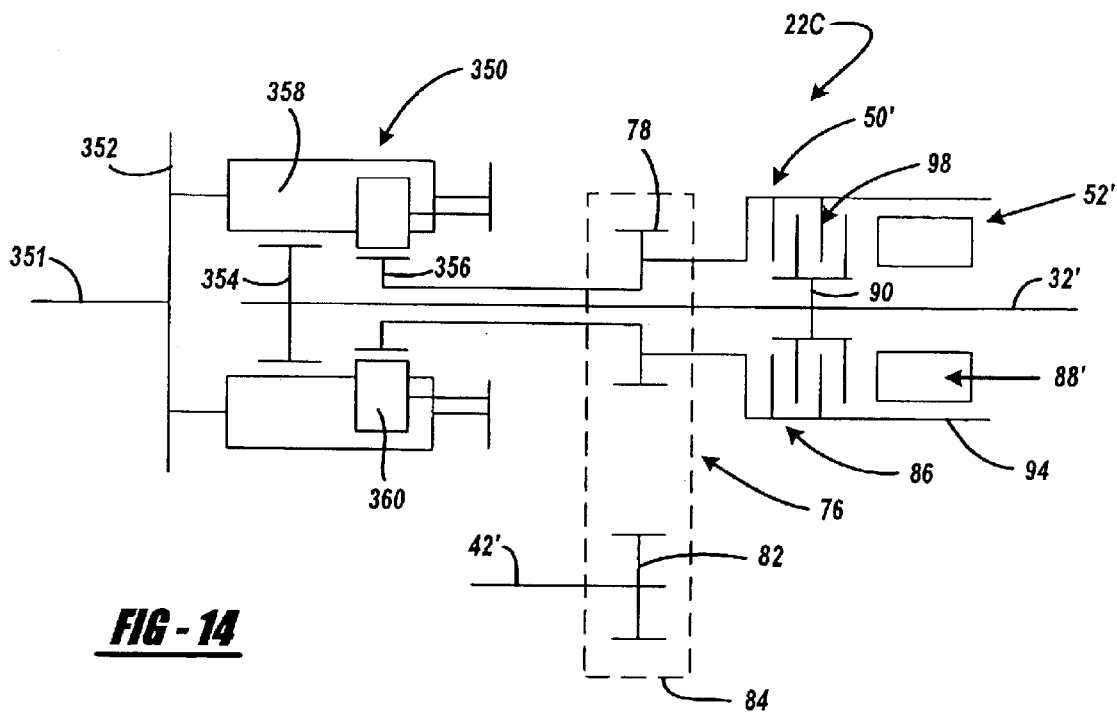

Referring now to FIG. 14, a full-time 4WD system is shown to include a transfer case 22C equipped with an interaxle differential 350 between an input shaft 351and output shafts 32' and 42'. Differential 350 includes an input defined as a planet carrier 352, a first output defined as a first sun gear 354, a second output defined as a second sun gear 356, and a gearset for permitting speed differentiation between first and second sun gears 354 and 356. The gearset includes meshed pairs of first planet gears 358 and second pinions 360 which are rotatably supported by carrier 352. First planet gears 358 are shown to mesh with first sun gear 354 while second planet gears 350 are meshed with second sun gear 356. First sun gear 354 is fixed for rotation with rear output shaft 32' so as to transmit drive torque to rear driveline 12. To transmit drive torque to front driveline 14, second sun gear 356 is coupled to transfer assembly 76 which includes first sprocket 78 rotatably supported on rear output shaft 32', a second sprocket 82 fixed to front output shaft 42', and a power chain 84.

Transfer case 22C further includes a biasing clutch 50' having a multi-plate clutch assembly 86 and a mode actuator 52' having a clutch actuator assembly 88. Clutch assembly 86 includes drum 94 fixed for rotation with first sprocket 78, hub 90 fixed for rotation with rear output shaft 32', and multi-plate clutch pack 98 operably disposed therebetween.

Figure 15:
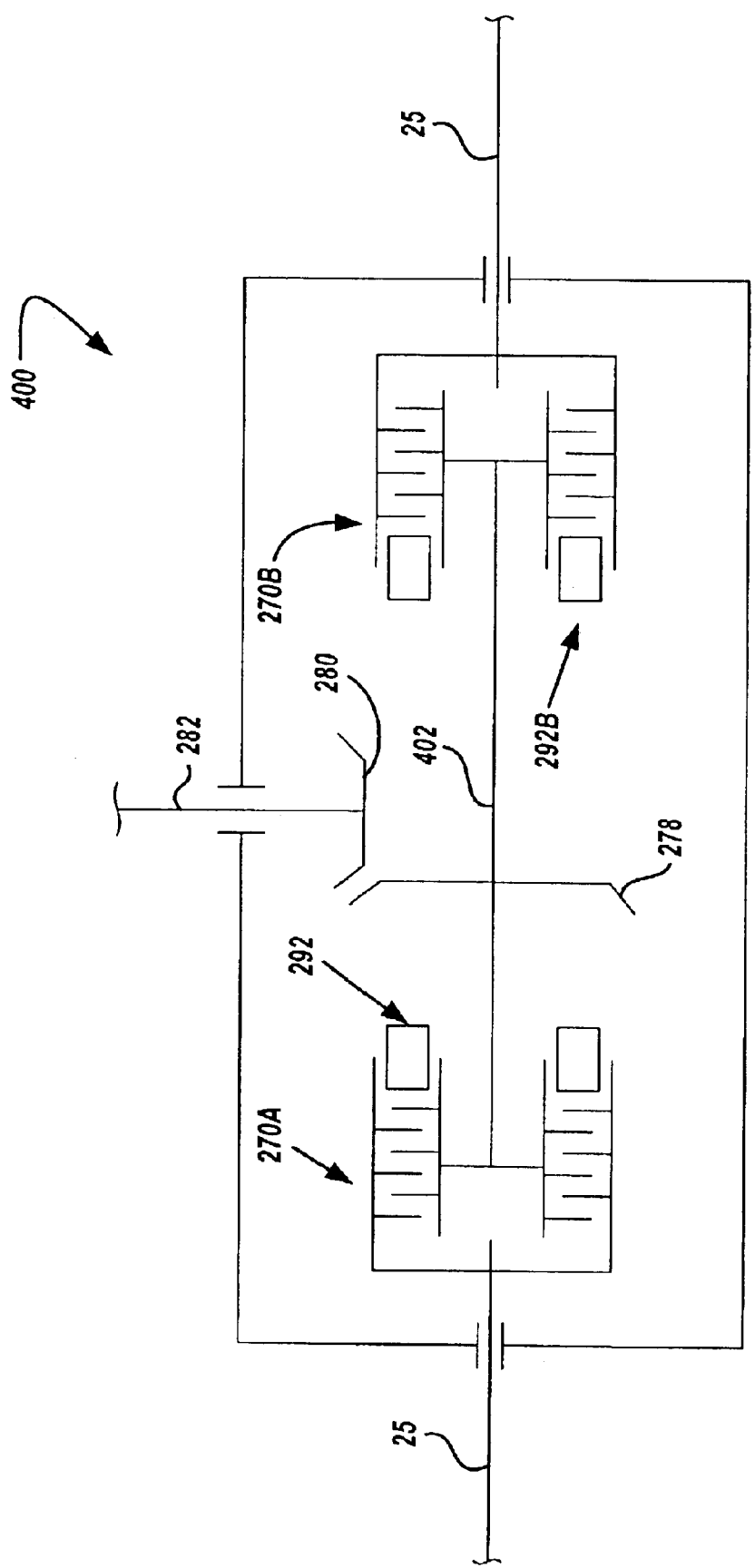

Referring now to FIG. 15, a drive axle assembly 400 is schematically shown to include a pair of torque couplings operably installed between a driven pinion shaft 282 and rear axle shafts 25. Pinion shaft 282 drives a right-angle gearset including pinion 280 and ring gear 278 which, in turn, drives a transfer shaft 402. A first torque coupling 270A is shown disposed between transfer shaft 402 and one of axle shaft 25 while a second torque coupling 270B is disposed between transfer shaft 402 and the other of axle shafts 25. Each of the torque couplings can be independently controlled via activation of its corresponding clutch actuator 292A, 292B to adaptively control side-to-side torque delivery. In a preferred application, axle assembly 400 can be used in association with the secondary driveline in four-wheel drive motor vehicles.

A number of preferred embodiments have been disclosed to provide those skilled in the art an understanding of the best mode currently contemplated for the operation and -construction of the present invention. The invention being thus described, it will be obvious that various modifications can be made without departing from the true spirit and scope of the invention, and all such modifications as would be considered by those skilled in the art are intended to be included within the scope of the following claims.

What is claimed is:

1. A power transmission device comprising:
   a rotary input member adapted to receive drive torque from a power source;
   a rotary output member adapted to provide drive torque to an output device;
   a torque transfer mechanism operable for transferring drive torque from said input member to said output member, said torque transfer mechanism including a friction clutch assembly operably disposed between said input member and said output member and a clutch actuator for applying a clutch engagement force to said friction clutch assembly, said clutch actuator including a wedge fork having a stem segment with a gear rack and a tang segment with a tapered drive surface, a reaction block having a tapered reaction surface engageable with said tapered drive surface on said tang segment and an apply surface engageable with said friction clutch assembly, and an electric motor driving a pinion gear that is meshed with said gear rack on said stem segment of said wedge fork; and
   a controller for actuating said electric motor so as to control the direction and amount of rotation of said pinion gear which, in turn, controls the direction and amount of translational movement of said wedge fork, such movement of said wedge fork causes said tapered drive surface on said tang segment to slide relative to said tapered reaction surface for forcibly moving said reaction block relative to said friction clutch assembly so as to vary the clutch engagement force exerted by said reaction block on said friction clutch assembly.

2. The power transmission device of claim 1 wherein said input member is a shaft, wherein said reaction block includes an annular hub segment journalled on said shaft and a plate segment extending from said hub segment, said plate segment having said tapered reaction surface formed on a first surface and said apply surface formed on a second surface, and wherein said wedge fork has a pair of said tangs disposed on opposite sides of said shaft with each of said tangs having said tapered drive surface formed thereon.

3. The power transmission device of claim 2 further comprising a second reaction block having an annular hub segment journalled and axially restrained on said shaft and a plate segment extending from said hub segment, said plate segment having a surface engageable with a reaction surface formed on each of said tangs on said wedge fork.

4. The power transmission device of claim 2 wherein said wedge fork is linearly moveable between a retracted position and an extended position in response to activation of said electric motor for causing corresponding sliding movement of said reaction block between a released position and a locked position relative to said friction clutch assembly, said reaction block exerting a minimum clutch engagement force on said clutch assembly when located in its released position and exerting a maximum clutch engagement force on said clutch assembly when located in its locked position.

5. The power transmission device of claim 4 wherein said shaft provides drive torque to a primary driveline of a motor vehicle, wherein said output member includes a second shaft that is coupled to a secondary driveline of the motor vehicle, and wherein said torque transfer mechanism is operable to transfer drive torque from said first shaft to said second shaft.

6. The power transmission device of claim 5 defining a transfer case wherein said first shaft is a primary output shaft driving the primary driveline, said second shaft is a secondary output shaft coupled to the secondary driveline, and wherein location of said wedge fork in its retracted position releases engagement of said clutch assembly so as to define a two-wheel drive mode, and location of said wedge fork in its extended position fully engages said clutch assembly so as to define a part-time four-wheel drive mode, said controller is operable to control activation of said electric motor for varying the position of said wedge fork between its retracted and extended positions to controllably vary the drive torque transferred from said primary output shaft to said secondary output shaft so as to define an on-demand four-wheel drive mode.

7. The power transmission device of claim 6 further comprising sensors to detect a vehicle operating condition, said controller receiving input signals from said sensors and generating an electric control signal based on said input signals which is supplied to said electric motor for controlling the direction and amount of rotary movement of said pinion gear.

8. The power transmission device of claim 5 defining a power take-off unit wherein said first shaft provides drive torque to a primary differential associated with the primary driveline, and wherein said second shaft is coupled to a secondary differential associated with the secondary driveline.

9. The power transmission device of claim 1 wherein said input member is a drive shaft driven by a drivetrain of a motor vehicle, said output member is a pinion shaft driving a differential associated with an axle assembly of the motor vehicle, and wherein said friction clutch assembly is disposed between said drive shaft and said pinion shaft such that actuation of said clutch actuator is operable to transfer drive torque from said drive shaft to said pinion shaft.

10. The power transmission device of claim 1 wherein said input member includes a first differential supplying drive torque to a pair of first wheels in a motor vehicle, and a transfer shaft driven by said differential, said output member includes a drive shaft coupled to a second differential interconnecting a pair of second wheels in the motor vehicle, and wherein said friction clutch assembly is disposed between said transfer shaft and said drive shaft.

11. The power transmission device of claim 1 wherein said input member includes a first shaft supplying drive torque to a second shaft which is coupled to a first differential for driving a pair of first wheels in a motor vehicle, said output member is a third shaft driving a second differential interconnecting a pair of second wheels of the motor vehicle, and wherein said friction clutch assembly is operably disposed between said first and third shafts.

12. The power transmission device of claim 1 further including an interaxle differential driven by said input member and having a first output driving a first driveline in a motor vehicle and a second output driving a second driveline in the motor vehicle, and wherein said clutch assembly is operably disposed between said first and second outputs of said interaxle differential.

13. The power transmission device of claim 1 wherein said tapered drive surface on said tang segment defines a first cam track, and said tapered reaction surface on said reaction block defines a second cam track, and wherein said first and second cam tracks are aligned and having rollers disposed therein.

14. A power transmission device comprising:
a rotary input member adapted to receive drive torque from a power source; a rotary output member adapted to provide drive torque to an output device;
a torque transfer mechanism operable for transferring drive torque from said input member to said output member, said torque transfer mechanism including a friction clutch assembly operably disposed between said input member and said output member and a clutch actuator for applying a clutch engagement force to said friction clutch assembly, said clutch actuator including a wedge fork having a stem segment with a gear rack and a pair of tang segments each having a tapered first surface and a second surface, a first reaction block having a tapered first surface engaging said tapered first surface on said tang segments and a second surface engageable with said friction clutch assembly, a second reaction block having a first surface engaging said second surface of said tang segments, and an electric motor having a rotary output driving a pinion gear that is meshed with said gear rack on said stem segment of said wedge fork; and
a controller for actuating said electric motor to control the direction and amount of rotation of said pinion gear for controlling the direction and amount of translational movement of said wedge fork, wherein translational movement of said wedge fork causes said tapered first surface on said tang segments to slide relative to said first surface on said first reaction block for forcibly moving said first reaction block so as to vary the clutch engagement force exerted by said second surface of said first reaction block on said friction clutch assembly.

15. The power transmission device of claim 14 wherein said input member is a shaft, and said first reaction block includes an annular hub segment journalled on said shaft and a plate segment extending from said hub segment, said plate segment having said tapered first surface and said second surface formed thereon, and wherein said tang segments are disposed on opposite sides of said shaft.

16. The power transmission device of claim 15 wherein said second reaction block has an annular hub segment journalled and axially restrained on said shaft and a plate segment extending from said hub segment.

17. The power transmission device of claim 15 wherein said wedge fork is linearly moveable between a retracted position and an extended position in response to activation of said electric motor for causing corresponding sliding movement of said first reaction block between a released position and a locked position relative to said friction clutch assembly, said first reaction block exerting a minimum clutch engagement force on said clutch assembly when located in its released position and exerting a maximum clutch engagement force on said clutch assembly when located in its locked position.

18. The power transmission device of claim 17 wherein said shaft provides drive torque to a primary driveline of a motor vehicle, wherein said output member includes a second shaft that is coupled to a secondary driveline of the motor vehicle, and wherein said torque transfer mechanism is operable to transfer drive torque from said first shaft to said second shaft.

19. The power transmission device of claim 18 defining a transfer case wherein said first shaft is a primary output shaft driving the primary driveline, said second shaft is a secondary output shaft coupled to the secondary driveline, and wherein location of said wedge fork in its retracted position releases engagement of said clutch assembly so as to define a two-wheel drive mode and location of said wedge fork in its extended position fully engages said clutch assembly so as to define a part-time four-wheel drive mode, said controller is operable to control activation of said electric motor for varying the position of said wedge fork between its retracted and extended positions for controllably varying the drive torque transferred from said primary output shaft to said secondary output shaft so as to define an on-demand four-wheel drive mode.

20. The power transmission device of claim 19 further comprising sensors to detect a vehicle operating condition, said controller receiving input signals from said sensors and generating an electric control signal based on said input signals which is supplied to said electric motor for controlling the direction and amount of rotary movement of said motor output.

21. The power transmission device of claim 14 wherein said input member is a drive shaft driven by a drivetrain of a motor vehicle, said output member is a pinion shaft driving a differential associated with an axle assembly of the motor vehicle, and wherein said friction clutch assembly is disposed between said drive shaft and said pinion shaft such that actuation of said clutch actuator is operable to transfer drive torque from said drive shaft to said pinion shaft.

22. The power transmission device of claim 14 wherein said input member includes a first differential supplying drive torque to a pair of first wheels in a motor vehicle and a transfer shaft driven by said first differential, said output member includes a drive shaft coupled to a second differential interconnecting a pair of second wheels in the motor vehicle, and wherein said friction clutch assembly is disposed between said transfer shaft and said drive shaft.

23. The power transmission device of claim 14 wherein said input member includes a first shaft supplying drive torque to a second shaft which is coupled to a first differential for driving a pair of first wheels in a motor vehicle, said output member is a third shaft driving a second differential interconnecting a pair of second wheels of the motor vehicle, and wherein said friction clutch assembly is operably disposed between said first and third shafts.

24. The power transmission device of claim 14 further including an interaxle differential driven by said input member and having a first output driving a first driveline in a motor vehicle and a second output driving a second driveline in the motor vehicle, and wherein said clutch assembly is operably disposed between said first and second outputs of said interaxle differential.

25. The power transmission device of claim 14 wherein said tapered first surface on said tang segments define a first cam track and said tapered first surface on said first reaction block defines a second cam track, wherein said first and second cam tracks are aligned and having rollers disposed therein.

26. A transfer case for use in a four-wheel drive vehicle having a powertrain and first and second drivelines, comprising:
   a first shaft driven by the powertrain and adapted for connection to the first driveline;
   a second shaft adapted for connection to the second driveline;
   a friction clutch assembly operably disposed between said first shaft and said second shaft;
   a clutch actuator for generating a clutch engagement force to be applied to said friction clutch assembly, said clutch actuator including a wedge fork having a stem segment with a gear rack and a tang segment with a tapered drive surface, a reaction block having a tapered reaction surface engaging said tapered drive surface on said tang segment and an apply surface engaging said friction clutch assembly, and an electric motor having a rotary output driving a pinion gear that is meshed with said gear rack on said stem segment of said wedge fork; and
   a controller for controlling bi-directional rotation of said pinion gear for causing corresponding bi-directional translational movement of said wedge fork which, in turn, causes sliding movement of said reaction block relative to said friction clutch assembly.

27. The transfer case of claim 26 wherein said reaction block includes an annular hub segment journalled on said first shaft and a plate segment extending from said hub segment, said plate segment having said tapered reaction surface formed on a first surface and said apply surface formed on a second surface, and wherein said wedge fork has a pair of said tangs disposed on opposite sides of said shaft with each of said tangs having said tapered drive surface formed thereon.

28. The transfer case of claim 27 further comprising a second reaction block having an annular hub segment journalled and axially restrained on said first shaft and a plate segment extending from said hub segment, said plate segment having a face surface engageable with a reaction surface formed on each of said tangs on said wedge fork.

29. The transfer case of claim 27 wherein said wedge fork is linearly moveable between a retracted position and an extended position in response to activation of said electric motor for causing corresponding sliding movement of said reaction block between a released position and a locked position relative to said friction clutch assembly, said reaction block exerting a minimum clutch engagement force on said clutch assembly when located in its released position and exerting a maximum clutch engagement force on said clutch assembly when located in its locked position.

30. The transfer case of claim 29 wherein said friction clutch assembly includes:
   a primary clutch having a first clutch pack operably disposed between said first and second shafts, a first pressure plate arranged for axial movement relative to said first clutch pack so as to exert said clutch engagement force thereon, and a return spring acting on said first pressure plate; and
   a secondary clutch operably disposed between said reaction block and said first pressure plate, said secondary clutch including a second clutch pack operably disposed between a hub and said second shaft, a ball ramp operator having a first member coupled to said hub, a second member acting on said first pressure plate, and rollers disposed in cam tracks formed between said first and second members, and a second pressure plate supported for movement relative to said second clutch pack in response to movement of said reaction block.

31. The transfer case of claim 27 wherein said first shaft is a first output shaft driving the first driveline, said second shaft is a second output shaft coupled to the second driveline, and wherein location of said wedge fork in its retracted position releases engagement of said clutch assembly so as to define a two-wheel drive mode, and location of said wedge fork in its extended position fully engages said clutch assembly so as to define a part-time four-wheel drive mode, and wherein said controller is operable to cause said electric motor to vary the position of said wedge fork between its retracted and extended positions for varying the drive torque transferred from said first output shaft to said second output shaft so as to define an on-demand four-wheel drive mode.

32. The transfer case of claim 31 further comprising sensors to detect a vehicle operating condition, said controller receiving input signals from said sensors and generating an electric control signal based on said input signals which is supplied to said electric motor for controlling the direction and amount of rotary movement of said motor output.

33. The power transmission device of claim 26 wherein said tapered drive surface on said tang segment defines a first cam track, wherein said tapered reaction surface on said reaction block has a second cam track, said first and second cam tracks being aligned and having rollers disposed therein.

34. A transfer case for use in a four-wheel drive vehicle having a powertrain and first and second drivelines, comprising:
   a differential having an input driven by the powertrain and first and second outputs driving the first and second drivelines;
   a friction clutch assembly operably disposed between any two of said input and said first and second outputs of said differential;
   a clutch actuator for generating a clutch engagement force to be applied to said friction clutch assembly, said clutch actuator including a wedge fork having a stem segment with a gear rack and a tang segment with a tapered drive surface, a reaction block having a tapered reaction surface engaging said tapered drive surface on said tang segment and an apply surface engaging said friction clutch assembly, and an electric motor having a rotary output driving a pinion gear that is meshed with said gear rack on said stem segment of said wedge fork; and a controller for actuating said electric motor to control bi-directional rotation of said pinion gear and corresponding bi-directional translational movement of said wedge fork which, in turn, causes sliding movement of said reaction block for applying said clutch engagement force to said friction clutch assembly.

35. The transfer case of claim 34 wherein said reaction block includes an annular hub segment and a plate segment extending from said hub segment, said plate segment having said tapered reaction surface formed on a first surface and said apply surface formed on a second surface.

36. The transfer case of claim 35 wherein said wedge fork is linearly moveable between a retracted position and an extended position in response to activation of said electric motor for causing corresponding sliding movement of said reaction block between a released position and a locked position relative to said friction clutch assembly, said reaction block exerting a minimum clutch engagement force on said clutch assembly when located in its released position and exerting a maximum clutch engagement force on said clutch assembly when located in its locked position.

37. The transfer case of claim 36 wherein said friction clutch assembly includes:

a primary clutch having a first clutch pack operably disposed between said first and second outputs, a first pressure plate arranged for axial movement relative to said first clutch pack so as to exert said clutch engagement force thereon, and a return spring acting on said first pressure plate; and a secondary clutch operably disposed between said reaction block and said first pressure plate, said secondary clutch including a second clutch pack operably disposed between a hub and said second output, a ball ramp operator having a first member coupled to said hub, a second member acting on said first pressure plate, and rollers disposed in cam tracks formed between said first and second members, and a second pressure plate supported for movement relative to said second clutch pack in response to movement of said reaction block.

38. The transfer case of claim 35 wherein location of said wedge fork in its retracted position releases engagement of said clutch assembly so as to define a full-time four-wheel drive mode, and location of said wedge fork in its extended position fully engages said clutch assembly so as to define a locked four-wheel drive mode, said controller is operable to control activation of said electric motor for varying the position of said wedge fork between its retracted and extended positions so as to adaptively vary the torque distribution between the first and second drivelines.

39. The transfer case of claim 34 wherein said tapered drive surface on said tang segment defines a first cam track and said tapered reaction surface on said reaction block defines a second cam track, and wherein said first and second cam tracks being aligned and having rollers disposed therein.

* * * * *